(12) United States Patent
Huttunen

(10) Patent No.: US 7,062,233 B2
(45) Date of Patent: Jun. 13, 2006

(54) TRANSMITTER LINEARIZATION

(75) Inventor: Mikko Huttunen, Espoo (FI)

(73) Assignee: Nokia Corporation, Espoo (FI)

( * ) Notice: Subject to any disclaimer, the term of this patent is extended or adjusted under 35 U.S.C. 154(b) by 806 days.

(21) Appl. No.: 09/881,335

(22) Filed: Jun. 14, 2001

(65) Prior Publication Data

US 2002/0016154 A1 Feb. 7, 2002

Related U.S. Application Data

(63) Continuation of application No. PCT/FI99/01051, filed on Dec. 16, 1999.

(30) Foreign Application Priority Data

Dec. 17, 1998 (FI) .................................. 982738

(51) Int. Cl.
H04B 1/04 (2006.01)

(52) U.S. Cl. ............................... 455/114.3; 455/115.1; 455/108; 455/313

(58) Field of Classification Search ................. 455/108, 455/114.2, 114.3, 115.1, 127.5, 126, 552.1, 455/313, 76, 553.1, 112, 314, 115.2, 63.1; 330/149, 126
See application file for complete search history.

(56) References Cited

U.S. PATENT DOCUMENTS

| 5,049,832 | A | * | 9/1991 | Cavers | 330/149 |
| 5,093,637 | A | | 3/1992 | Isota et al. | |
| 5,252,930 | A | * | 10/1993 | Blauvelt | 330/149 |
| 6,054,894 | A | * | 4/2000 | Wright et al. | 330/149 |
| 6,373,902 | B1 | * | 4/2002 | Park et al. | 375/296 |
| 6,519,010 | B1 | * | 2/2003 | Twitchell et al. | 348/608 |

FOREIGN PATENT DOCUMENTS

| EP | 0 658 975 | 6/1995 |
| EP | 0 731 556 | 9/1996 |
| EP | 0 907 276 | 4/1999 |
| WO | WO 00/08870 | 2/2000 |

OTHER PUBLICATIONS

International Search Report for PCT/FI99/01051.

* cited by examiner

Primary Examiner—Nick Corsaro
Assistant Examiner—John J. Lee
(74) Attorney, Agent, or Firm—Squire, Sanders & Dempsey L.L.P.

(57) ABSTRACT

A method for defining correction parameters used in transmitter linearization executed by a predistortion method and a transmitter comprising: sampling means (9) for sampling the signal (OUT) coming out of the transmitter, a predistorter (3A, 3B, 4) for predistorting the signal to be sent (I_IN, Q_IN) to compensate the nonlinearity of the transmitter, the transmitter also comprising: categorization means (17) for categorizing into predefined classes signal samples (FB) taken from the signal (OUT) coming out of the transmitter, comparison means (17) for comparing the signal samples (FB) with the corresponding ideal signal values (REF), and definition means (17), responsive to said comparison means (17), for defining amplitude and preferably phase correction parameters for each class in question, whereby the predistorter is arranged to use said correction parameters when predistorting the signal being transmitted.

6 Claims, 2 Drawing Sheets

TRANSMITTER LINEARIZATION

This application is a Continuation of International Application PCT/FI99/01051 filed Dec. 16, 1999 which designated the U.S. and was published under PCT Article 21(2) in English.

BACKGROUND OF THE INVENTION

The invention relates to linearization of a radio transmitter.

The scarcity of radio frequencies leads to a need to use spectrum-efficient modulation methods in new radio systems. In Europe, a new radio system standard has been developed for PMR (Professional Mobile Radio) users, called TETRA (Terrestrial Trunked Radio). As the modulation method of the TETRA system, π/4-DQPSK (π/4-shifted Differential Quadrature Phase Shift Keying) has been chosen. From the transmitter point of view, a drawback of the modulation method is the variation in the amplitude of the envelope of the RF signal. In a nonlinear amplifier, such a variation causes InterModulation (IM). IM products spread the spectrum of the transmitted signal, and thus tend to reduce the benefits of using a linear modulation method. The IM products cannot usually be filtered as they form very close to the desired signal. With constant amplitude modulation methods, spectrum spreading does not occur, and consequently the signal may be amplified by a nonlinear amplifier.

A trunked PMR system, in which different user groups share same radio channels, has strict requirements regarding adjacent channel interference caused by a transmitter. These requirements call for a good linearity in the transmitter of the used radio system.

In a power amplifier, good linearity is only achieved with poor efficiency. However, the efficiency of portable devices should be as high as possible for the operation time to be adequate and in order not to waste battery capacity. Further, at least relatively good efficiency is required of the power amplifiers at base stations to avoid cooling problems. The achieving of adequate efficiency and linearity calls for linearizing the transmitter.

If the nonlinearities of an amplifier were known in advance, it would be possible to form inverse functions of the nonlinearities, and use them to convert the input signal, whereby the nonlinearities would be cancelled. The properties of the amplifier do not, however, remain the same but vary due to ageing, warming up, and according to the radio channel and transmit power used. In addition, the amplifiers have individual differences. Need exists for linearization methods that must in an adaptive way be capable of adapting to changing conditions.

Development work has been targeted into a number of different linearizing methods, and three of them have been found to possess qualities suitable for practical radio systems. These methods are feedforward, cartesian feedback and predistortion. A linearization method can also be adaptive.

Thus, if the nonlinear transfer function of the amplifier is known and if it does not vary as a function of time, the signal to be transmitted can be linearized by applying a suitable transfer function causing a predistortion to the signal. This way, the signal coming out of the amplifier can be made linear. This method is called predistortion. Predistortion is usually performed on baseband using a lookup table into which the conversion parameters causing the predistortion, i.e. the predistortion parameters, are stored.

For instance, with the temperature and age change of the amplifier its transfer function also changes and it becomes necessary to update the predistortion parameters in the lookup table. Prior art solutions use a gradient-based search for this purpose. A gradient-based search adapts towards minimizing an error. A problem in a gradient-based search is its slowness.

BRIEF DESCRIPTION OF THE INVENTION

It is thus an object of the invention to develop a method and an apparatus implementing the method so as to solve the above problems. The object of the invention is achieved by a method and a system characterized by what is stated in the independent claims. Preferred embodiments of the invention are disclosed in the dependent claims.

The invention is based on the idea that an amplifier model is not formed and predistortion parameters are not defined using a gradient search, but the model is formed quickly and without a slow convergence on the basis of a measured signal, i.e. a transmitter output signal, and a corresponding input signal buffered into memory or any other corresponding ideal reference signal. The speed of the method of the invention is based on the fact that the nonlinearity of the transmitter is defined directly on the basis of a certain sample material in certain classes, such as classes according to the transmit power. This can be done faster than a definition based on minimizing the error, in which the nonlinearity of the transmitter must be determined by testing in different classes, whereby the number of tests may be large.

An advantage of the invention is that it provides a considerable improvement in prior art solutions by offering a faster way of updating the predistorter correction parameters. According to tests performed by the applicant, the method of the invention is up to 10 times faster than the gradient search used in prior art

BRIEF DESCRIPTION OF THE DRAWINGS

The invention will now be described in greater detail in connection with preferred embodiments and with reference to the attached drawings in which.

DETAILED DESCRIPTION OF THE INVENTION

Figure 1:
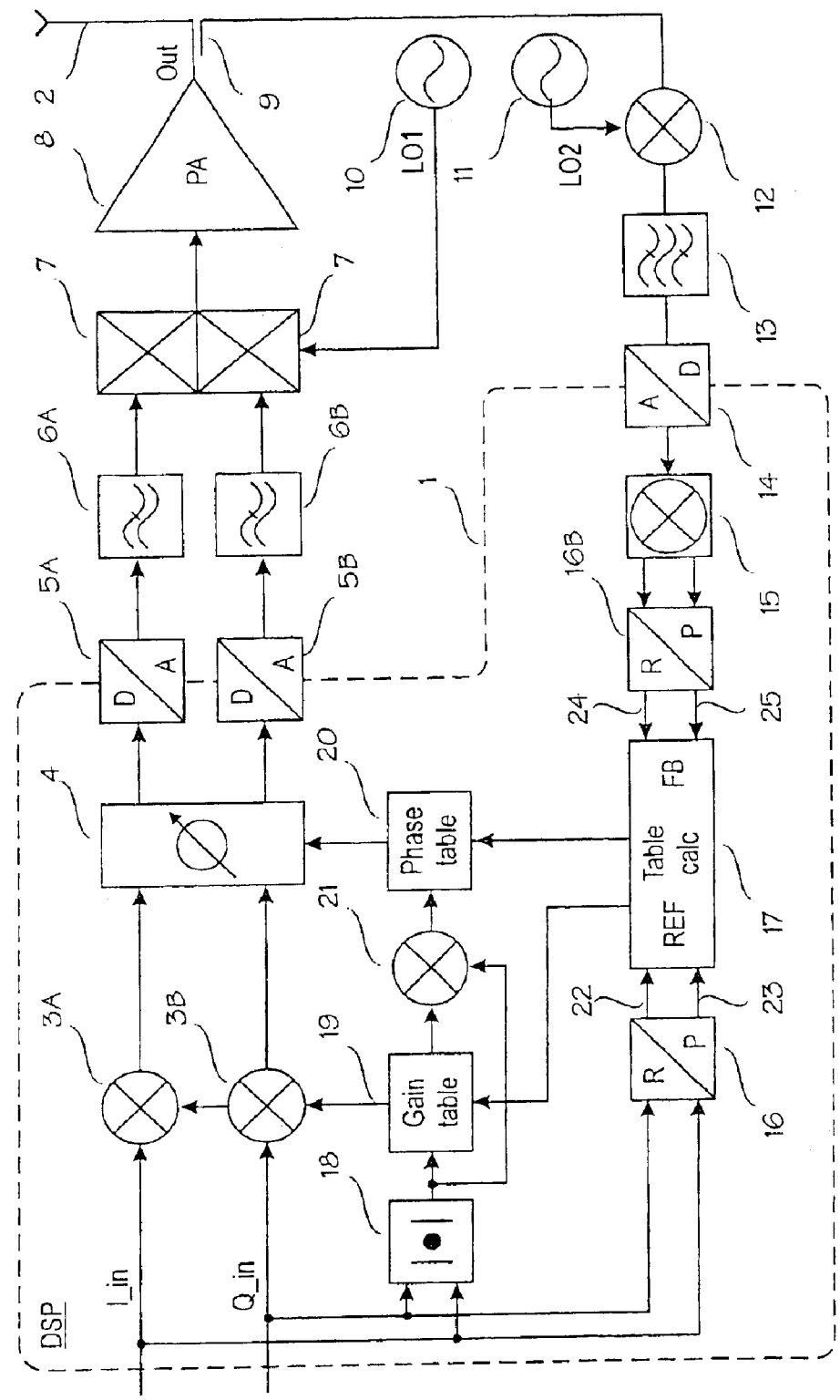
FIG. 1 shows a block diagram of a transmitter of the invention according to one embodiment.

FIG. 1 shows a block diagram of a transmitter of the invention according to one embodiment. It should be noted that the figure shows only the elements that are essential for understanding the invention. In the figure, the transmitter receives an I and Q signal I_IN and Q_IN for transmission. Predistortion has been implemented using a digital signal processor (DSP) 1. Predistortion of the amplitude occurs in the multiplier elements 3A and 3B in accordance with an amplitude correction parameter obtained from an amplitude table 19. Correspondingly, a possible phase predistortion occurs in a phase shifter element 4 in accordance with a phase correction parameter obtained from a phase table 20. The predistorted signals are D/A-converted using D/A converters 5A and 5B into analogue signals which are also preferably filtered using low-pass reconstruction filters 6A and 6B. These signals are forwarded on to an I/Q modulator 7. The I/Q modulator 7 and an I/Q demodulator 15 operate according to the quadrature modulation principle. With this principle, it is possible to combine two independent signals in the transmitter, to transmit them on the same transmission band and then to separate them from each other in a receiver. The quadrature modulation principle is that two separate signals, I and Q (Inphase and Quadrature phase), are modulated using the same carrier frequency, but the phases of the carriers differ in that the carrier of the signal Q lags 90° behind the carrier of the signal I. After modulation, the signals are summed. Due to phase difference, the signals I and Q can be separated from each other when the sum signal is demodulated. In the I/Q modulator 7, the signals are modulated and combined. The I/Q modulator is synchronized by a local oscillator 10. The I/Q-modulated signal is forwarded to a power amplifier PA 8 and onward to an OUT antenna 2 for transmission. At the same time, feedback is formed by means of a sampling arrangement 9, for instance a directional coupler. A radio frequency (e.g. 400 MHz) feedback signal is preferably down-converted to an intermediate frequency of 450 kHz, for instance, using a down-converter 12. The down-conversion is synchronized by a local oscillator 11. The intermediate frequency signal can, if necessary, be filtered using a broadband filter 13 and subsequently attenuated. The intermediate frequency signal is sampled using an A/D converter 14 for baseband (or intermediate frequency) processing.

The I/Q demodulator 15 has been implemented using a digital signal processor 1. The AID-converted intermediate frequency feedback signal is I/Q-demodulated with the I/Q demodulator 15 by digital multiplication into baseband I and Q signals. The I/Q demodulator is implemented by program in the digital signal processor 218, and a separate analogue I/Q demodulator is not needed. I/Q demodulation could also be performed as an analogue process without affecting the invention. The baseband I and Q feedback signals are preferably converted from an orthogonal presentation to a polar presentation in a converter 16B, whereby the amplitude and phase are directly obtained from the converted signals and forwarded to a calculation unit 17 in which the predistortion tables 19 and 20 are generated, which generation is described later in this description. The signals $I_{13}$ IN and Q_IN received by the transmitter for transmission, which are preferably also converted to a polar presentation in the converter 16, are also forwarded to the calculation unit 17. The actual predistortion is done by means of the created predistortion tables 19 and 20. An absolute value of the complex signal formed by the signals I_IN and Q_IN, i.e. the amplitude of the signal, is defined in an element 18. This amplitude data is entered into the amplitude predistortion table 19 which provides a corresponding amplitude correction parameter to the multiplier elements 3A and 3B on the basis of the amplitude data. A corrected, i.e. predistorted amplitude data, formed using a multiplier element 21 is entered into the phase predistortion table 20. On the basis of this data, the phase table 20 provides the correct phase correction parameter to the phase shifter element 4. The amplitude data is preferably used as control data in the phase table 20, because a phase error in the transmitter depends on the amplitude of the signal. The amplitude data received by the phase table 20 is preferably also predistorted and thus corresponds to the amplitude of the signal coming out of the predistorter, whose magnitude determines the nonlinearity in the transmitter, and the phase predistortion required can be defined as accurately as possible. It is also possible to use amplitude predistortion only, which means that the phase predistortion table 20 and phase shifter element 4 are not needed.

The creation of the amplitude and phase predistortion tables 19 and 20 of the invention is performed as follows:

samples 22 and 23 of the transmitter input signals I_IN and Q_IN and samples 24 and 25 of the (complex) transmitter output signal OUT are used as the inputs of the calculation element 17 in FIG. 1. The signals 22 and 23 together form a complex reference signal REF in polar presentation. The reference signal REF is ideal in that it does not have any nonlinearity caused by the transmitter. Correspondingly, the signals 24 and 25 together form a complex feedback signal FB in polar presentation. The signals REF and FB are normalized so that the highest amplitude in both signals is 1. The reference signal REF and the corresponding feedback signal FB arrive at different times at the calculation element 17, because the transmitter causes a certain delay in the transmission of the signal, i.e. the value of the reference signal REF corresponding to a certain sample point of the incoming complex signal I_IN and Q_IN arrives at the calculation element 17 earlier than the value of the corresponding feedback signal FB. Because of this, the reference signal REF is buffered in order to be able to compare in the calculation element 17 the value of a certain input complex signal I_IN and Q_IN which was input into the transmitter and the corresponding value which comes out of the transmitter. To form the predistortion tables 19 and 20, the predistortion parameters in tables 19 and 20 are set to values in which no predistortion occurs. After this, a suitable signal is fed into the transmitter and a predefined number of samples (e.g. 160 to 2,250) are taken from the signal I_IN and Q_IN coming in to the transmitter and from the signal OUT coming out of the transmitter. The amplitude values of the mutually corresponding sample points of the sample signals REF and FB are categorized into a required number of classes (e.g. 128 to 16,384) on the basis of the amplitude of the reference signal REF. The samples are preferably categorized on the basis of the amplitude, because the nonlinearity of the transmitter depends on the transmit power which, for its part, depends on the amplitude of the signal. Next, the values of the sample points of the feedback signal FB are compared with the corresponding buffered values of the reference signal REF, and the correction parameters are defined based on this comparison.

Figure 2:
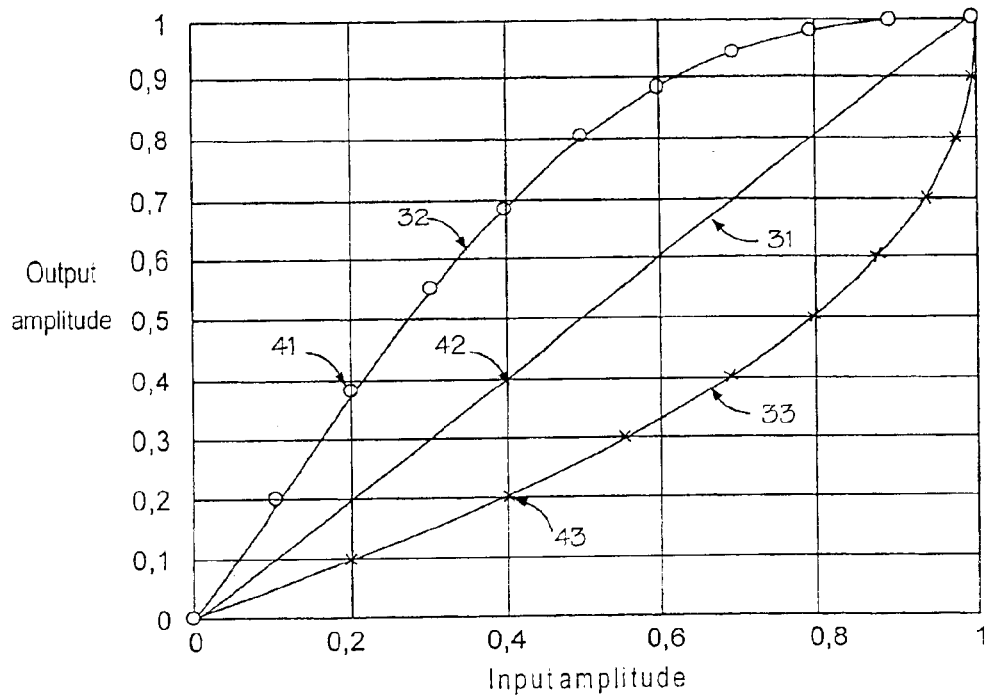
FIG. 2 shows characteristic curves of the amplitudes of amplifiers and a predistorter.

The comparison and the definition of the correction parameters are, for the part of the amplitude, illustrated in FIG. 2. Straight line 31 shows the dependence of the normalized output amplitude of an ideal transmitter on the normalized input amplitude. Straight line 31 also shows the dependence of the reference signal REF on the input signal I_IN and Q_IN of the input signal, i.e. they are equal. Curve 32 shows the nonlinear characteristic curve of the transmitter (when no predistortion is used). The nonlinearity of the transmitter is mainly caused by the power amplifier 8. The transmitter can also have several power amplifiers 8 in series. Curve 32. is defined on the basis of the sample signals REF and FB for instance as follows: an average of the amplitudes of the sample points of the feedback signal FB in every class is calculated. Similarly, an average of the sample points of the reference signal REF corresponding to the sample points of the feedback signal FB in every class is calculated. The value of curve 32 at the centre point of the class in question in relation to the ideal curve 31 is obtained with the ratio of the calculated averages. In FIG. 2, the centre points of classes are marked with circles. The ratio can also be calculated by first defining the ratio of the amplitudes of each sample point of the feedback signal FB and the corresponding sample points of the reference signal REF and then defining the average of the ratios of the sample point pairs in each class. Curve 33 is the characteristic curve of the predistorter obtained by mirroring the characteristic curve 32 of the transmitter defined without predistortion in relation to the ideal curve 31. This is done, for instance, by defining a counterpart for each point (marked with circles) of the characteristic curve 32 of the transmitter. For instance, the counterpart of point 41 is determined by first finding a point of the ideal curve 31 that corresponds to the point 41 on the basis of the output amplitude value. In the example, where the output amplitude is 0.4, the result is the point 42 of the ideal curve 31. Next, a point is searched whose input amplitude value is the same as that of the defined ideal curve point 42 (0.4) and whose output amplitude value is the same as the input amplitude value (0.2) of the point 41 of the characteristic curve 32. In this case, the counterpart of the point 41 is the point 43. A counterpart is defined for each point of the characteristic curve 32 in the same way. The counterparts (marked with x in FIG. 2) form the characteristic curve 33 of the predistorter. The characteristic curve 32 of the transmitter is discrete in relation to the input amplitude (the x axis), and the characteristic curve 33 of the predistorter defined on the basis of it is discrete in relation to the output amplitude (the y axis), i.e. they have been defined in the marked points only (the circles and the x's) due to the categorizaton of the samples into classes. The more classes are used, the more points are obtained, and, further, the closer one gets to the continuous curves 32 and 33 marked with a continuous line in the figure.

When the points of the predistorter characteristic curve 33 have been defined, the amplitude predistortion table 19 can be created. Because the predistorter characteristic curve 33 is discrete in relation to the output amplitude, i.e. the amplitude correction parameter has been defined for certain output amplitude values only, as described above, and because, on the other hand, the predistorter input amplitude can obtain any values, the correction parameter to be used for a certain input amplitude is defined by finding the point closest to the input amplitude on the discrete curve 33 and using the amplitude correction parameter corresponding to this point. The amplitude correction parameter refers here to a value by which the input amplitude should be multiplied to obtain the required output amplitude according to the characteristic curve 33 of the predistorter. The correction parameter is thus obtained at a certain point of curve 33 by dividing the value of the output amplitude by the value of the input amplitude at the point in question. The amplitude predistortion table 19 can be formed by defining for a certain defined correction parameter a certain input amplitude value range within which the correction parameter is used. This can be done by means of the characteristic curve 33 by dividing curve 33 into ranges in relation to the input amplitude, the centre points of the ranges (marked with x's) being the points at which the output amplitude and correction parameter have been defined. The table can then be used to check, into which range the value of the input amplitude belongs, and the correction parameter corresponding to the range can then be used.

Figure 3:
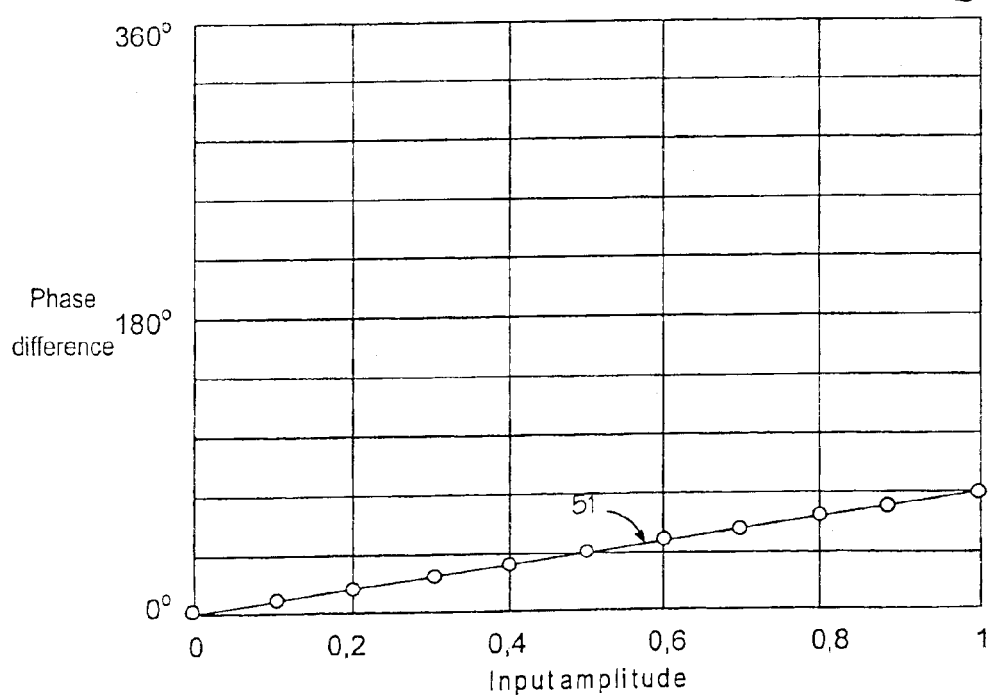
FIG. 3 shows a characteristic curve of phase difference.

FIG. 3 illustrates the definition of the correction parameters of the phase difference (between the sample point of the feedback signal FB and the sample point of the corresponding reference signal REF). The figure shows an example of phase difference as a function of a normalized amplitude (input amplitude) of the reference signal REF, i.e. curve 51. The characteristic curve 51 of the phase is formed by defining the average phase differences of the sample point pairs of the feedback signal FB and the reference signal REF in each class into which they have been categorized on the basis of the amplitude when defining the amplitude correction parameters as described above. In other words, the phase differences are categorized into classes on the basis of the normalized amplitude of the reference signal REF and the average of the phase differences is calculated for each class. This way, the characteristic curve values of the amplifier phase at the centre point of each class, i.e. the points marked with circles in FIG. 3 forming the discrete characteristic curve of the phase, are obtained. The more classes are used, the solider curve 51 becomes.

When the points of the characteristic curve 51 of the phase have been defined, the phase predistortion table 20 can be created. Because the characteristic curve 51 of the phase is discrete, i.e. the phase difference has been defined for certain input amplitude values (class averages) only, as described above, and, on the other hand, because the input amplitude can obtain any values, the correction parameter for a certain input amplitude is defined by finding the point closest to the input amplitude on the discrete characteristic curve 51 of the phase and using the phase correction parameter corresponding to this point. The phase correction parameter refers here to the value which defines how much the phase of a signal arriving at the predistorter must be shifted and into which direction to achieve the required phase predistortion. The correction parameter is thus obtained at a certain point of the characteristic curve 51 by multiplying the phase difference value by −1 at the point in question, i.e. the phase is predistorted into the opposite direction by the amount of the phase difference. The phase predistortion table 20 can be formed, for instance, by defining for a certain defined correction parameter a certain input amplitude value range within which the correction parameter is used. This can be done by means of the characteristic curve 51 by dividing curve 51 into ranges in relation to the input amplitude, the centre points of the ranges (marked with circles) being the points at which the output amplitude and, thus also, the correction parameter have been defined. The table can then be used for checking, into which range the value of the input amplitude belongs, and the correction parameter corresponding to the range can then be used.

If a signal sample class does not contain any samples and the correction parameter can thus not be defined on the basis of the samples, a correction parameter of another class, preferably of a class closest to it, can be defined as the correction parameter of such a class. The correction parameter can also be defined by interpolation, or by some other method, on the basis of the correction parameters of several adjacent classes containing samples.

The format of the data in the predistortion tables 19 and 20 can differ from the above without making any difference to the basic idea of the invention. Similarly, the creation of the predistortion tables can differ from what is described above. Instead of a separate amplitude table 19 and phase table 20, also a combined predistortion table can be used in which a certain input amplitude value has a complex correction parameter which includes both the amplitude and phase correction parameters. It is also possible to use only amplitude predistortion, which reduces memory use, since a phase predistortion table is not needed.

To reiterate, the definition of the predistortion tables 19 and 20 is done as follows:

1) The correction parameters in the amplitude predistortion table 19 are set to 1 (the signal is multiplied by 1, no predistortion occurs) and the correction parameters in the phase predistortion table 20 are set to 0 (the signal phase is shifted 0 degrees, no predistortion occurs).

2) A normal modulated signal or another signal suited for training is transmitted.

3) Samples are taken from the signal OUT being transmitted through the feedback branch.

4) The delay caused by the circuit is compensated for.

5) The corresponding samples 22 and 23 taken from the signals I_IN and Q_IN fed into the transmitter and the samples 24 and 25 taken from the signal OUT coming out of the transmitter are compared with each other and the characteristic curves of the transmitter are formed for the amplitude 33 and the phase 51.

6) The predistortion tables 19 and 20 are created by means of the characteristic curves.

Although the use of the invention is here described mainly in connection with the TETRA system, this does not in any way limit the use of the invention in other types of systems. The structure of the transmitter used may differ from what is described herein without deviating from the basic idea of the invention.

It is obvious to a person skilled in the art that while technology advances, the basic idea of the invention may be implemented in many different ways. The invention and its embodiments are thus not limited to the examples described above, but can vary within the scope of the claims.

What is claimed is:

1. A method for defining correction parameters used in transmitter linearization executed by a predistortion method, the method comprising the following steps:
    (a) taking a plurality of samples at a time from a signal coming out of said transmitter,
    (b) categorizing the plurality of signal samples into classes,
    (c) comparing the plurality of signal samples with corresponding ideal signal values and
    (d) defining a correction parameter for each class on the basis of an average comparison result of all signal samples of the class in question, wherein said steps (c) and (d) comprise the following steps for each class;
    comparing the normalized amplitude and phase of each signal sample of the class in question with the normalized amplitude and phase of the signal fed into the transmitter and corresponding to the sample respectively,
    defining the ratios of the amplitude values and differences of the phase values
    calculating the average of the ratios of the amplitude values defined and the average of the phase value differences and
    defining the correction parameter for the class in question on the basis of the calculated averages.

2. A method for defining correction parameters used in transmitter linearization executed by a predistortion method, the method comprising the following steps:
    (a) taking a plurality of samples at a time from a signal coming out of said transmitter,
    (b) categorizing the plurality of signal samples into classes,
    (c) comparing the plurality of signal samples with corresponding ideal signal values and
    (d) defining a correction parameter for each class on the basis of an average comparison result of all signal samples of the class in question, wherein said steps (c) and (d) comprise the following steps for each class
    calculating the average of the normalized amplitudes of the signal samples of the class in question and the average of the normalized amplitudes of the signals fed into the transmitter and corresponding to the samples of the class in question,
    calculating the average of the phases of the signal samples of the class in question and the average of the phases of the signals fed into the transmitter and corresponding to the samples of the class in question,
    comparing said amplitude averages,
    defining the ratio of the amplitude value averages,
    comparing said phase averages,
    defining the difference of the phase value averages and
    defining the correction parameter for the class in question on the basis of the ratio of the amplitude value averages and the difference of the phase value averages defined.

3. A method for defining correction parameters used in transmitter linearization executed by a predistortion method, the method comprising the following steps:
    (a) taking a plurality of samples at a time from a signal coming out of said transmitter,
    (b) categorizing the plurality of signal samples into classes,
    (c) comparing the plurality of signal samples with corresponding ideal signal values and
    (d) defining a correction parameter for each class on the basis of an average comparison result of all signal samples of the class in question, wherein said steps (c) and (d) comprise the following steps for each class
    comparing the normalized amplitude of each signal sample of the class in question to the normalized amplitude of the corresponding signal fed into the transmitter,
    defining the ratios of these amplitude values,
    calculating the average of the ratios and
    defining the correction parameter for the class in question on the basis of the calculated average, wherein said definition of a correction parameter for a certain class, if the class in question has no signal samples, comprises the following step
    defining as the correction parameter of the class in question the correction parameter of another class, preferably the correction parameter of the closest class, or
    defining the correction parameter of the class in question by interpolation from the correction parameters of the closest classes containing samples.

4. A transmitter comprising:
    sampling means for sampling the signal coming out of the transmitter and configured to take a plurality of samples at a time,
    a predistorter for predistorting the signal to be sent to compensate the nonlinearity of the transmitter,
    categorization means for categorizing into classes said plurality of signal samples taken from the signal coming out of the transmitter,
    comparison means for comparing the said plurality of signal samples with the corresponding ideal signal values, and
    definition means, responsive to said comparison means, for defining amplitude and preferably phase correction parameters for each class on the basis of an average comparison result of all signal samples of the class in question, whereby the predistorter is arranged to use said correction parameters when predistorting the signal being transmitted.

5. A transmitter as claimed in claim 4, wherein said definition means are, if it is not possible to define a correction parameter for a class, adapted to take a corresponding correction parameter from another class and to define it as the correction parameter for the required class.

6. A transmitter as claimed in claim 4, wherein said categorization means are adapted to categorize said sampled signal samples on the basis of the ideal signal value corresponding to each signal sample.

* * * * *